United States Patent [19]
Yoshida et al.

[11] 3,983,085
[45] Sept. 28, 1976

[54] STABILIZED HALOGEN-CONTAINING RESIN COMPOSITIONS

[75] Inventors: Ryonosuke Yoshida, Kamakura; Kazutami Sakamoto, Kawasaki, both of Japan

[73] Assignee: Ajinomoto Co., Inc., Kyoba, Japan

[22] Filed: July 15, 1975

[21] Appl. No.: 596,153

[30] Foreign Application Priority Data
July 24, 1974  Japan................................ 49-84726
Apr. 21, 1975  Japan................................ 50-48387

[52] U.S. Cl...................... 260/23 XA; 260/45.75 W; 260/45.85 A
[51] Int. Cl.²........................................... C08J 3/20
[58] Field of Search................ 260/23 XA, 45.75 W, 260/45.85 A, 31.2 R

[56] References Cited
UNITED STATES PATENTS

| | | | |
|---|---|---|---|
| 2,135,641 | 11/1938 | Jacobson | 260/45.85 A |
| 2,525,643 | 10/1950 | Britton et al. | 260/45.85 A |
| 3,078,301 | 2/1963 | Taub | 260/31.2 R |
| 3,102,107 | 8/1963 | Soeder | 260/45.85 A |
| 3,275,616 | 9/1966 | Hammond | 260/31.2 R |
| 3,335,108 | 8/1967 | Pines | 260/45.85 A |
| 3,403,126 | 9/1968 | Mod et al. | 260/31.2 R |
| 3,414,537 | 12/1968 | Dikotter et al. | 260/45.75 C |
| 3,518,224 | 6/1970 | Eggensperger et al. | 260/23 XA |
| 3,798,195 | 3/1974 | Watson | 260/45.85 A |

FOREIGN PATENTS OR APPLICATIONS
49-16109  7/1974  Japan

*Primary Examiner*—V. P. Hoke
*Attorney, Agent, or Firm*—Oblon, Fisher, Spivak, McClelland & Maier

[57] ABSTRACT

Thermally stabilized compositions of halogen-containing resins may be obtained by addition to the resin of a stabilizing agent of $N^\omega$-higher alkyl or higher aliphatic acyl basic amino acid chelates of divalent metals or a mixture of or precursory ingredients thereof which is capable of forming $N^\omega$-higher alkyl or higher aliphatic acyl-basic amino acid chelates when heated at the usual processing temperature of the halogen-containing resin.

7 Claims, No Drawings

STABILIZED HALOGEN-CONTAINING RESIN COMPOSITIONS

BACKGROUND OF THE INVENTION

FIELD OF THE INVENTION

The present invention relates to stabilized halogen-containing resins, and more particularly thermally stabilized compositions of halogen-containing resins.

It is well known that when halogen-containing resins, including polyvinyl halide and halogenated polyolefin are subjected to exposure to sunlight or to elevated temperature during or after compounding or processing, they undergo marked change in color and transparency and become brittle owing to occurrence of a decomposition reaction which is mainly attributable to release of hydrogen halide. A number of stabilizers have been proposed for preventing said deterioration. Among these stabilizers, those which exhibit excellent stabilizing effect are organo tin compounds and cadmium and lead soaps. However, the use of these is limited because of their high toxicity. Calcium and zinc soaps which are low toxic stabilizers exhibit inferior thermal stability as compared with cadmium soap.

Thus, the development of non- or low toxic stabilizers exhibiting excellent thermal stability has been eagerly sought.

It is an object of this invention to provide an improved thermally stabilized halogen-containing resin composition. Another object of this invention is to provide an improved thermal stabilizer having low toxicity.

It has also been known that salts of N-aliphatic acyl or aromatic acyl derivatives of neutral or acidic amino acids with divalent metal are useful as stabilizers for halogen-containing resins (Japanese Patent Publication No. 16109/1974). It has been found, however, that the halogen-containing resins stabilized with these N-acyl neutral and acidic amino acid salts have some deficiencies, particularly in respect to color and transparency. Initial discoloration occurs rapidly at the usual processing temperature of 160° to 190°C.

SUMMARY OF INVENTION

It has now been found that an alkaline earth metal or zinc chelate of $N^\omega$ higher alkyl or higher aliphatic acyl-substituted basic amino acid is a markedly more effective stabilizer than some of the known low toxic stabilizers such as calcium and zinc soaps, and alkaline earth metals and zinc salts of N-acyl neutral and acidic amino acids.

It has further been found that similarly excellent thermally stabilized halogenh-containing resin compositions may be obtained by addition to halogen-containing resins of a mixture of precursory ingredients which is capable of forming $N^\omega$ -higher alkyl- or higher aliphatic acyl substituted basic amino acid chelates of alkaline earth metals and zinc when heated to the usual processing temperature.

DESCRIPTION OF THE PREFERRED EMBODIMENTS

A halogen-containing resin composition in accordance with this invention comprises a halogen-containing resin and a stabilizing amount of an alkaline earth metal or zinc chelate of $N^\omega$ -alkyl- or aliphatic acyl substituted basic amino acid having the general formula

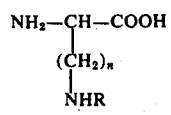

wherein R is selected from the group consisting of alkyl hydrocarbon radical having 8 to 22 carbon atoms and acyl radicals of saturated or unsaturated fatty acids having 8 to 22 carbon atoms, and n is an integer of 1 to 4 or a stabilizing amount of the precursory ingredients of said chelate, namely a mixture of (A) a basic amino acid derivative selected from the group consisting of the $N^\omega$ -substituted basic amino acids defined by the above general formula and a salt of a basic amino acid with a fatty acid having 8 to 22 carbon atoms, and (B) a metal compound selected from the group consisting of alkaline earth metal compound and zinc compound, said metal compounds being an oxide, a hydroxide, or carbonate.

Suitable basic amino acid whose $N^\omega$ -higher alkyl hydrocarbon- or higher aliphatic acyl derivative is a constituent ingredient of the stabilizer of this invention include α, β-diaminopropionic acid, α, γ-diaminobutyric acid, ornithine or lysine. The substituent represented by R in the general formula can be a straight or branched chain alkyl hydrocarbon radical having 8 to 22 carbon atoms, such as octyl, decyl, dodecyl, tetradecyl, pentadocyl, hexadecyl, heptadecyl, octadecyl, 2-octyldodecyl or 2-hexyldocyl; or an acyl radical of a saturated or unsaturated fatty acid having 8 to 22 carbon atoms, such as lauroyl, decanoyl, myristoyl, pendadecanoyl, palmitoyl, stearoyl, oleoyl, and a radical of naturally occurring mixed fatty acids derived from coconut oil, tallow oil, hydrogenated tallow oil and the like.

The basic amino acid component may be in the optically active form or in the racemic form. Suitable chelates are the alkaline earth metal chelates such as those of calcium, magnesium and barium, and the zinc chelates.

$N^\omega$ -higher alkyl- or higher aliphatic acyl substituted basic amino acid chelates of the divalent metal specified may be easily prepared, for example, by reacting the corresponding $N^\omega$ -substituted basic amino acid with the corresponding divalent metal oxide, hydroxide, chloride or carbonate in substantially stoichiometrical proportions in the presence of organic solvents such as ethanol and xylene at reflux temperatures.

Instead of using as stabilizer $N^\omega$ -subtstituted basic amino acid chelates of the selected divalent metal, there may be employed a mixture of precursory ingredients or reactants which is capable of forming an $N^\omega$ -substituted basic amino acid chelate when heated to the usual processing temperature of halogen-containing resins. For this purpose, $N^\omega$ -substituted basic amino acid may be incorporated into a halogen-containing resin in admixture with a divalent metal oxide, hydroxide, or carbonate in substantially stoichiometrical proportions, whereby halogen-containing resin compositions having similarly excellent thermal stability may be obtained. Furthermore, in place of $N^\omega$ -higher aliphatic acyl basic amino acid, there may be incorporated a salt of a basic amino acid with a saturated or an unsaturated fatty acid having 8 to 22 carbon atoms, since the heating of the fatty acid salt of a basic amino acid at 100°c – 250°c gives a high yield of $N^\omega$-acyl derivative of the basic amino acid. Therefore, a mixture of (A) a basic amino acid derivative selected from the group consisting of $N^\omega$-alkyl basic amino acids whose alkyl radical has 8 to 22 carbon atoms, $N^\omega$-acyl basic amino acid whose acyl radical is one derived from fatty acids having 8 to 22 carbon atoms and a salt of a basic amino acid with a fatty acid having 8 to 22 carbon atoms and (B) a divalent metal oxide, hydroxide, or carbonate is equally effective as a stabilizer.

Among stabilizers of this invention, $N^\omega$-higher acyl basic amino acid chelates of zinc and precursory ingredient mixtures thereof, that is a mixture of (A) $N^\omega$-acyl basic amino acids or fatty acid salts of basic amino acid and (B) zinc oxide, zinc hydroxide, or zinc carbonate are particularly effective.

Suitable specific examples of $N^\omega$-substituted basic amino acids represented by the general formula are $N^\omega$-higher alkyl basic amino acids such as $N^\epsilon$-lauryllysine, $N^\epsilon$-decyllysine, $N^\epsilon$-stearyllysine, $N^\delta$-laurylornithine, $N^\delta$-palmitylornithine; $N^\omega$-higher aliphatic acyl basic amino acids such as $N^\epsilon$-stearoyllysine, $N^\epsilon$-palmitoyllysine, $N^\epsilon$-lauroyllysine, $N^\epsilon$-hydrogenated tallow fatty acyl lysine, $N^\delta$-stearoylornithine, $N^\delta$-myristoylornithine and $N^\delta$-hydrogenated tallow fatty acyl ornithine.

Either an $N^\omega$-substituted basic amino acid chelate or a mixture of the precursory ingredients thereof are valuable stabilizers for halogen-containing resins, because of their low toxicity and because of their excellent thermal stabilizing action.

It is, of course, possible to use the $N^\omega$-substituted basic amino acid chelate or the precursory ingredients mixture thereof as the sole stabilizer, or it may be used in combination with other well known low toxic stabilizers, such as calcium and zinc soaps.

Suitable halogen-containing resins which may be stabilized with the stabilizers of this invention include polyvinyl halide, polyvinylidene halide, copolymer of vinyl halide and vinylidene halide, copolymer of vinyl halide and ethylene, copolymer obtained by copolymerization of vinyl halide or vinylidene halide with other unsaturated monomers copolymerizable therewith, for example, viny esters of carboxylic acids such as vinyl acetate, vinyl propionate, vinyl butyrate, vinyl benzoate; esters of unsaturated acids such as methyl, ethyl, propyl, butyl, allyl esters of acrylic acid and the corresponding esters of methacrylic acid; vinyl aromatic compounds such as styrene; esters of $\alpha, \beta$-unsaturated carboxylic acids such as methyl, ethyl, propyl, octyl esters of maleic, crotonic, itaconic and fumaric acids, and halogenated polyolefins such as chlorinated polyethylene and chlorinated polypropylene.

In the compounding of the halogen-containing resins, the $N^\omega$-substituted basic amino acid chelate stabilizer or the precursory ingredients mixture thereof are added ordinarily into the halogen-containing resins together with the necessary plasticizers by suitable milling techniques and then the resulting composition is processed at an elevated temperature, for example, within the range from 150°C to 200°C on hot rolls or in a heated mixer.

The proportion of the stabilizer of this invention may vary over a great range but usually 0.5 to 5 parts by weight per 100 parts of halogen-containing resins are suitable.

With the halogen-containing resins, there may be incorporated other stabilizers, and other additives for example plasticizers, organic chelates, fillers, lubricants, pigments, blowing agents, antistatic agents, antioxidants, anti-flaming agents, light stabilizers, ultraviolet absorption agents, fluorescent agents, antiseptics, bactericides, non-metal stabilizers, epoxy resins, processing aids, mold releasing agents and the like.

The stabilized compositions of this invention are useful in the manufacture of moldings, extrusions, sheets, films, coatings, and similar articles.

The following examples are further illustrative of this invention. All parts referred to are by weight.

EXAMPLES 1 – 2

Table 1 below shows the results of thermal stability tests conducted with a series of polyvinyl chloride samples stabilized with various stabilizers, including zinc chelates of $N^\omega$-higher acyl basic amino acids, metal soaps and zinc salts of N-higher acyl neutral amino acids.

In each of the samples, 100 parts polyvinyl chloride "Geon 103, Ep 8" was first thoroughly blended with 50 parts plasticizer dioctyl phthalate. 3 parts stabilizer was thereafter blended into the plasticized polyvinyl chloride samples. Then the mixture was blended on a roll mill heated to 160°C. The samples were thoroughly mixed for 10 minutes and then rolled into sheets. These sheets were press polished at 160°C for 10 minutes and then cut into 3 cm squares. Six squares of each sample were put between two pieces of glass plates and heated in a forced draft oven at 190°C. The treatment times were 30, 60 and 120 minutes respectively.

From the data in table 1, it is apparent that the zinc chelates of $N^\epsilon$-stearoyl lysine and of $N^\delta$-stearoyl ornithine have considerably greater thermal stability than cadmium stearate, zinc stearate, zinc N-stearoyl-DL-phenylalaninate and zinc N-stearoyl-DL-valinate.

EXAMPLES 3 – 5

A vinyl plastic composition containing the following ingredients is prepared and tested in the manner described in Example 1. The results are shown in table 2.

| | |
|---|---|
| Vinyl chloride polymer (Geon 103 E.p 8) | 100 parts |
| Plasticizer dioctyl phthalate | 50 |
| Stabilizer | 3 |

EXAMPLES 6 – 13

A vinyl plastic composition containing the following ingredients is prepared and tested in the manner described in Example 1. The results are shown in table 3.

| | |
|---|---|
| Vinyl chloride polymer (Geon 103 E.p 8) | 100 parts |
| Plasticizer dioctyl phthalate | 50 |
| Stabilizer | 1.5~3 |

EXAMPLES 14 – 17

A vinyl plastic composition containing the following ingredients is prepared and tested in the manner described in Example 1. The results are shown in table 4.

| | |
|---|---|
| Vinyl chloride polymer (Geon 103 E.p 8) | 100 parts |
| Plasticizer dioctyl phthalate | 30 |
| Stabilizer | 3 |

EXAMPLE 18

A vinyl plastic composition containing the following ingredients is prepared and tested in the manner described in Example 1.

| | |
|---|---|
| Vinyl chloride polymer (Geon 103 E.p 8) | 100 parts |
| Plasticizer dioctyl phthalate | 50 |
| N$^\epsilon$-stearoyl-L-lysine | 2.7 |
| Zinc oxide | 0.3 |

A mixture of N-stearoyl-L-lysine and zinc oxide gave good thermal stability.

EXAMPLES 19 – 25

These examples illustrate the stabilizing action of the stabilizers of this invention in combination with other stabilizers. A vinyl plastic composition containing the following ingredients is prepared and tested in the manner described in Example 1.

| | |
|---|---|
| Vinyl chloride polymer (Geon 103 E.p 108) | 100 parts |
| Plasticizer dioctyl phthalate | 30 or 50 parts |
| Stabilizers | 3 or 5 parts |

The results are shown in table 5.

Table 1

| Example No. | Stabilizer | Color heated period 30 | 60 | heated at 190°C 120 mits. | Transparency 30 | 60 | heated at 190°C 120 mits |
|---|---|---|---|---|---|---|---|
| 1 | Zn-N$^\epsilon$-stearoyl-L-Lysinate | ◎ | ◎ | O | ◎ | ◎ | O |
| 2 | Zn-N$^\delta$-stearoyl-L-ornitinate | ◎ | ◎ | O | ◎ | ◎ | O |
| Control 1 | Cd-stearate | ◎ | X | # | ◎ | X | # |
| Control 2 | Zn-stearate | X | # | # | X | # | # |
| Control 3 | Cd-Ba-Pb-stearate "OW-80"* | ◎ | ◎ | O | ◎ | ◎ | O |
| Control 4 | Zn-N-stearoyl-DL-phenylalaninate | ◎ | O | # | O | X | # |
| Control 5 | Zn-N-stearoyl-DL-valinate | O | X | # | O | X | # |

◎ : not changed
X : yellow or cloudy
O : light yellow or little cloudy
# : black or not transparent
*Cd-Ba-Pb stearate "OW-80" (trade name, a product of Sakai Chemical Industry Co., Ltd.)

Table 2

| Example No. | Stabilizer | Color heated 60 minutes at 160°C | 190°C | Transparency heated 60 minutes at 160°C | 190°C |
|---|---|---|---|---|---|
| 3 | Zn-N$^\epsilon$-stearoyl-L-lysinate | ◎ | O | ◎ | ◎ |
| 4 | Zn-N$^\delta$-hydrogenated tallow fatty acyl-DL-ornitinate | O | O | ◎ | O |
| 5 | Ca-N$^\epsilon$-stearoyl-DL-lysinate 1.5 parts Zn-N$^\epsilon$-stearoyl-DL-lysinate 1.5 parts | ◎ | ◎ | ◎ | ◎ |
| Control 3 | Cd-Ba-Pb stearate "OW-80" | ◎ | ◎ | ◎ | ◎ |
| Control 6 | Ca-Zn-stearate** "OW-860" | ◎ | O | ◎ | X |
| Control 1 | Cd-Stearate | ◎ | # | ◎ | X |
| Control 2 | Zn-Stearate | # | # | X | # |

**Ca-Zn-Stearate "OW-860" (trade name, a product of Sakai Chemical Industry Co., Ltd.)

Table 3

| Example No. | Stabilizer | added (Parts) | heated for 60 min. at 160°C Color | Transparency |
|---|---|---|---|---|
| 6 | Zn-N$^\epsilon$-hydrogenated tallow fatty acyl DL-lysinate | 3 | ◎ | ◎ |
| 7 | Zn-N$^\epsilon$-stearoyl-L-lysinate | 3 | ◎ | ◎ |
| 8 | " | 2 | ◎ | ◎ |
| 9 | " | 1.5 | ◎ | ◎ |
| 10 | Zn-N$^\epsilon$-palmytoyl-L-lysinate | 3 | ◎ | ◎ |
| 11 | Zn-N$^\epsilon$-myristoyl-L-lysinate | 3 | ◎ | O |
| 12 | Zn-N$^\epsilon$-lauroyl-L-lysinate | 3 | O | ◎ |
| 13 | Zn-N$^\epsilon$-stearyl-L-lysine | 3 | O | ◎ |
| Control 1 | Cd-Stearate | 3 | ◎ | ◎ |
| Control 6 | Ca-Zn-Stearate "OW-860" | 3 | ◎ | ◎ |
| Control 7 | " | 2 | O | ◎ |

Table 3-continued

| Example No. | Stabilizer | added (Parts) | heated for 60 min. at 160°C Color | Transparency |
| --- | --- | --- | --- | --- |
| Control 8 | " | 1.5 | O | ◎ |

Table 4

| Example No. | Stabilizer | added (Parts) | heated for 60 mints. at 160°C Color | Transparency |
| --- | --- | --- | --- | --- |
| 14 | $N^\varepsilon$-hydrogenated tallow fatty acyl-L-lysine | 2.7 | ◎ | ◎ |
|  | Zinc oxide | 0.15 |  |  |
|  | Calcium hydroxide | 0.15 |  |  |
| 15 | $N^\varepsilon$-palmytoyl-L-lysine | 2.7 | ◎ | O |
|  | Zinc oxide | 0.15 |  |  |
|  | Calcium hydroxide | 0.15 |  |  |
| 16 | DL-lysine palmytate | 2.7 | O | O |
|  | Zinc hydroxide | 0.3 |  |  |
| 17 | $N^\delta$-palmytoyl-L-ornitine | 2.7 | O | ◎ |
|  | Zinc hydroxide | 0.3 |  |  |
| Control 9 | Zn-Stearate | 1.5 | ◎ | O |
|  | Ca-Stearate | 1.5 |  |  |

Table 5

| Example No. | Stabilizer | Parts | Plasticizer Parts | heated for 60 minutes at 160°C Color | Transparency |
| --- | --- | --- | --- | --- | --- |
| 19 | $N^\varepsilon$-Stearoyl-L-lysine | 2.7 | 50 | ◎ | ◎ |
|  | Calcium hydroxide | 0.3 |  |  |  |
|  | Zn-Stearate | 1 |  |  |  |
| 20 | L-lysine stearate | 2.7 | 30 | O | ◎ |
|  | Zinc oxide | 0.3 |  |  |  |
|  | Epoxylated soybean oil | 2 |  |  |  |
| 21 | $N^\varepsilon$-hydrogenated tallow fatty acyl-DL-lysine | 2.7 | 50 | ◎ | ◎ |
|  | Stearic acid | 2.7 |  |  |  |
|  | Zinc oxide | 0.3 |  |  |  |
|  | Calcium carbonate | 0.3 |  |  |  |
| 22 | Zn-$N^\varepsilon$-Stearoyl-L-lysinate | 2 | 50 | ◎ | O |
|  | Ca-Stearate | 1 |  |  |  |
| 23 | Ca-$N^\varepsilon$-stearoyl-L-lysinate | 2 | 50 | ◎ | O |
|  | Zn-Stearate | 2 |  |  |  |
| 24 | Zn-$N^\omega$-hydrogenated tallow fatty acyl-$\alpha,\gamma$-diamino butyrate | 1 | 50 | ◎ | O |
|  | Ca-Stearate | 2 |  |  |  |
| 25 | Zn-$N^\beta$-lauroyl-$\alpha,\beta$-diamino-propionate | 1 | 50 | ◎ | O |
|  | Ca-Stearate | 2 |  |  |  |
| Control 1 | Cd-Stearate |  | 50 | ◎ | ◎ |

What we claim is:

1. A halogen-containing resin composition comprising a halogen containing resin selected from the group consisting of polyvinyl chloride, polyvinylidene chloride, a copolymer of vinyl chloride and vinylidene chloride with copolymerizable unsaturated monomers, chlorinated polyethylene and chlorinated polypropylene and one or more of stabilizers selected from the group consisting of 1. a chelate compound of (A) an $N^\omega$-substituted basic amino acid having the general formula

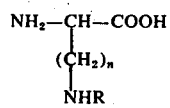

wherein R is selected from the group consisting of an alkyl hydrocarbon radical having 8 to 22 carbon atoms and an acyl radical of a saturated or unsaturated fatty acid having 8 to 22 carbon atoms, and $n$ is an integer of 1 to 4 with (B) divalent metal selected from the group consisting of alkaline earth metals and zinc, and 2. a mixture of (A) a basic amino acid derivative selected from the group consisting of a salt of a basic amino acid selected from the group consisting of $\alpha,\beta$ diaminopropionic acid, $\alpha,\gamma$-diaminobutyric acid, ornithine and lysine with a saturated or unsaturated fatty acid having 8 to 22 carbon atoms and an $N^\omega$-substituted basic amino acid defined by the above general formula and (B) a divalent metal compound selected from the group consisting of alkaline earth metal compounds and zinc compounds, said divalent compound being an oxide, hydroxide, or carbonate and the proportion of (A) to (B) being substantially stoichimetrical; wherein the amount of stabilizer is 0.5 to 5 parts by weight per 100 parts by weight of said halogen-containing resin.

2. The composition of claim 1, wherein said stabilizer is an alkaline earth metal or zinc chelate of an $N^\omega$-acyl basic amino acid whose acyl radical is one of a fatty acid having 8 to 22 carbon atoms.

3. The composition of claim 1, wherein said stabilizer is a zinc chelate of $N^\epsilon$-acyl lysine whose acyl radical is one of a fatty acid having 8 to 22 carbon atoms.

4. The composition of claim 1, wherein said stabilizer is a mixture of an $N^\omega$-acyl basic amino acid and zinc oxide.

5. The composition of claim 1, wherein said stabilizer is a mixture of a salt of lysine with a fatty acid having 8 to 22 carbon atoms and zinc oxide.

6. The composition of claim 1, wherein said stabilizer is a member selected from the group consisting of a zinc chelate of $N^\epsilon$-stearoyllysine, a zinc chelate of $N^\epsilon$-palmitoyllysine, a zinc chelate of $N^\epsilon$-lauroyllysine, a zinc chelate of $N^\epsilon$-hydrogenated tallow fatty acyl lysine, a zinc chelate of $N^\delta$-stearoylornithine, a zinc chelate of $N^\delta$-palmitoylornithine, a zinc chelate of $N^\delta$-lauroylornithine and a zinc chelate of $N^\delta$-hydrogenated tallow fatty acyl ornithine.

7. The composition of claim 1, wherein said halogen-containing resin is polyvinyl chloride.

* * * * *

UNITED STATES PATENT AND TRADEMARK OFFICE
CERTIFICATE OF CORRECTION

PATENT NO. : 3,983,085
DATED : September 28, 1976
INVENTOR(S) : Ryonosuke Yoshida et al It is certified that error appears in the above-identified patent and that said Letters Patent are hereby corrected as shown below:

[73] Assignee: change " Kyoba," to --Tokyo--

Signed and Sealed this

Seventh Day of December 1976

[SEAL]

Attest:

RUTH C. MASON
Attesting Officer

C. MARSHALL DANN
Commissioner of Patents and Trademarks